United States Patent [19]

King et al.

[11] Patent Number: 5,501,185

[45] Date of Patent: Mar. 26, 1996

[54] BIOGAS-DRIVEN GENERATOR SET

[75] Inventors: James L. King, Sheboygan; Timothy J. Mintner, Elkhart Lake, both of Wis.

[73] Assignee: Kohler Co., Kohler, Wis.

[21] Appl. No.: 369,623

[22] Filed: Jan. 6, 1995

[51] Int. Cl.$^6$ .......................... F02B 43/04; F02B 75/12; F02M 21/04
[52] U.S. Cl. .................. 123/73 AD; 123/527; 123/1 A
[58] Field of Search ................................ 123/527, 1 A, 123/196 R, 73 AD

[56] References Cited

U.S. PATENT DOCUMENTS

| | | | |
|---|---|---|---|
| 2,738,861 | 7/1952 | Emele et al. | 184/6 |
| 2,869,514 | 1/1959 | Gloss | 184/6.8 |
| 3,211,255 | 10/1965 | Miyazaki | 184/55 |
| 3,446,313 | 5/1969 | Scherenberg | 184/6 |
| 3,720,290 | 3/1973 | Lansky et al. | 184/55 A |
| 4,218,328 | 8/1980 | Vaughan | 252/33.3 |
| 4,389,981 | 6/1983 | Meyer | 123/3 |
| 4,437,813 | 3/1984 | Ingram | 417/53 |
| 4,568,473 | 2/1986 | Theodore et al. | 252/51.5 R |
| 4,697,553 | 10/1987 | Lie | 123/73 |
| 4,750,454 | 6/1988 | Santina et al. | 123/3 |
| 4,774,909 | 10/1988 | Doldever | 123/527 |
| 4,989,573 | 2/1991 | Yokoyama et al. | 123/527 |
| 5,027,758 | 7/1991 | Siegler | 123/73 AD |
| 5,034,114 | 7/1991 | Kukin | 208/48 AA |
| 5,300,819 | 4/1994 | Lee | 123/3 |

Primary Examiner—Erick R. Solis
Attorney, Agent, or Firm—Quarles & Brady

[57] ABSTRACT

A generator powered by an internal combustion engine is fueled from a source of biogas. A pump boosts the pressure of the biogas, and a regulator controls the biogas pressure supplied to the fuel intake of the engine carburetor. Acid-neutralizing oil is injected into the biogas stream at the intake of the pump to protect the engine from corrosion due to acidic constituents in the biogas.

7 Claims, 3 Drawing Sheets

BIOGAS-DRIVEN GENERATOR SET

BACKGROUND OF THE INVENTION

The field of the invention is internal combustion engines fueled by biogas, and particularly, applications such as electrical generator sets in which the engine is operated intermittently.

Biogas is produced by the anaerobic digestion of hydrocarbons. Organic waste materials such as wood byproducts (wood chips, sawdust, bark, etc.), public and private landfills, food processing byproducts, waste treatment plants and farm waste, produce biogas comprised mainly of methane and carbon dioxide. Any organic waste that can be processed through an anaerobic digester will produce methane in concentrations ranging from 50% to 80%. Unfortunately, there are other constituents produced by the anaerobic digestion of hydrocarbons, some that are inert and others that can form acids with the water vapor being produced. For example, small quantities of hydrogen sulfide may be produced and form sulfuric acid, and mercaptans, which are alcohols with an OH radical, can also form sulfuric acid. Carbon dioxide, which is produced in significant amounts is an ingredient for carbonic acid.

Biogas is used commercially in three ways. First, it can be burned directly to produce heat. This is the simplest use, since the various constituents are of little concern in the combustion process. Biogas may also be filtered and pumped into natural gas pipelines for widespread distribution. And finally the biogas may be filtered and applied to fuel an internal combustion engine. This latter application is particularly useful because the engine may power a generator which produces electrical energy.

When used to fuel an internal combustion engine, the constituents in biogas can significantly shorten the useful life of the engine. This is particularly true when the engine is operated intermittently. During shutdown, the last few strokes of the engine piston intakes unburned biogas. The various acids discussed above soon form and corrode the surfaces of the cylinder walls, the piston rings, valve seats and spark plug. These acids leak by the corroded rings into the oil sump where they are pumped throughout the engine. The contaminated oil is particularly corrosive for copper and lead alloy components. As this corrosive process progresses, the engine becomes more difficult to start until it eventually fails completely.

A typical prior art biogas driven system is shown schematically in FIG. 1, where the biogas is produced in a digester 10 and stored in a vessel 12. The pressure of the biogas can vary considerably, and a regulator 14 is employed to maintain the gas pressure at a relatively constant level at the input 16 of a carburetor 18. The biogas is mixed with combustion air in the carburetor 18 and injected into the engine cylinder 20. This basic system may also include a pump which boosts the biogas pressure in applications where the pressure is less than 4 inches of water, and it may include gas filters when corrosive constituents are a known problem. For example, hydrogen sulfide can be removed using a variety of liquid absorbents and/or solid phase oxidants, however, these chemical solutions are expensive and capital intensive. Several dry processes are also available using particles of either activated carbon, molecular sieve, or iron sponge to remove the sulfides from biogas. These are also very expensive.

SUMMARY OF THE INVENTION

The present invention is a system for fueling an internal combustion engine with biogas in which a neutralizing oil is injected into the biogas intake to coat engine components and protect them from the corrosive effects of acid. More specifically, the invention includes: an internal combustion engine having an intake for receiving a mixture of biogas and air; a carburetor mixer having an air intake, a biogas intake and an output for delivering a mixture of biogas and air to the engine intake; a reservoir of acid-neutralizing oil, and means for delivering a stream of biogas to the carburetor intake and injecting acid-neutralizing oil from the reservoir into the biogas stream.

A general object of the invention is to reduce the corrosion of engine components due to acids produced by biogas constituents. By injecting a highly basic lubricating oil into the stream of biogas, the surfaces of the fuel delivery system as well as the engine cylinder walls and piston are coated with oil. Any acids which are formed from biogas constituents are neutralized by the basic nature of the oil, and their corrosive effects are thus reduced.

Another object of the invention is to provide a biogas fuel delivery system for an internal combustion engine that may be used with biogas sources of widely varying pressures and constituent content. A compressor pump is used to boost the pressure of the biogas fuel and a regulator controls the pressure of the biogas applied to the carburetor. The neutralizing oil is injected into the biogas stream at the input to the pump to protect it and all the other "downstream" components. Inexpensive water traps or biogas filters may also be added "upstream" from the oil injection to remove water or other constituents from the biogas.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION Of THE PREFERRED EMBODIMENT

Figure 1:
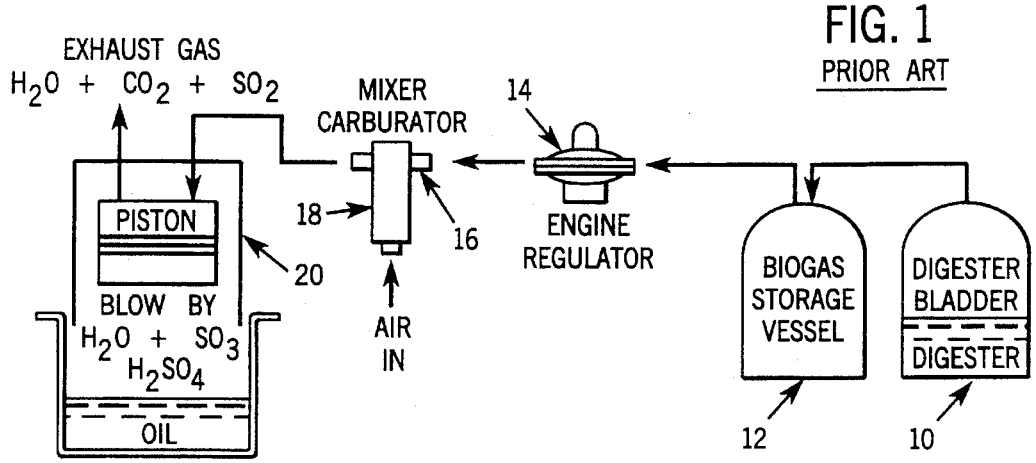
FIG. 1 is a schematic drawing of a typical prior art biogas fuel delivery system.
Figure 2:
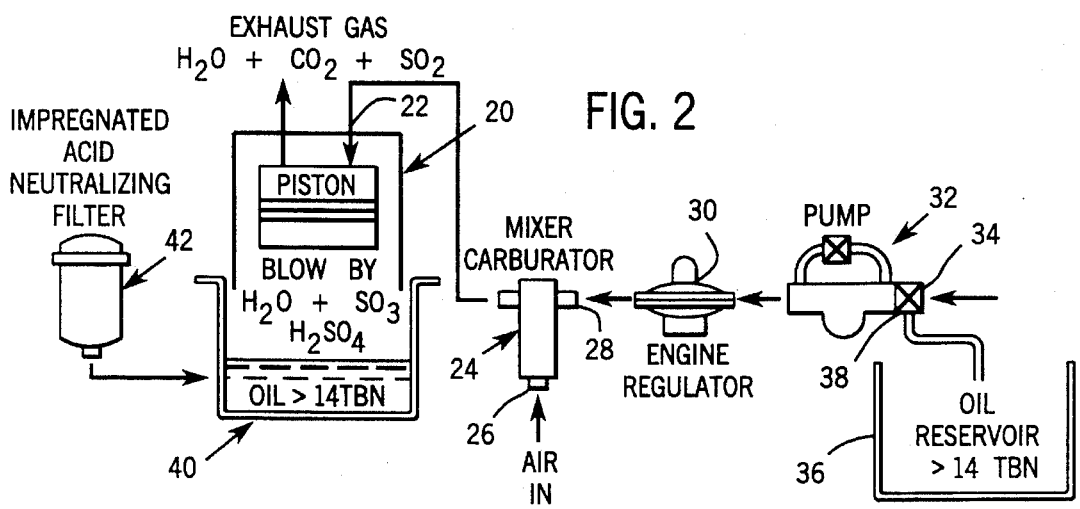
FIG. 2 is a schematic drawing of a biogas fuel delivery system according to the present invention.

Referring particularly to FIG. 2, an engine cylinder 20 has an intake 22 which receives a biogas/air mixture from a carburetor mixer 24. The carburetor mixer 24 has an air intake 26 and a biogas intake 28 that connects to an engine gas regulator 30. The regulator 30 receives biogas at a relatively high pressure (e.g. 5 to 15 inches of water) and produces a stream of biogas at its output for the carburetor 24 to a regulated pressure of 5 inches of water. A rotary biogas booster compressor, or pump 32, receives biogas at intake 34 from the available source and boosts its pressure for application to the regulator 30.

It is a teaching of the present invention that a neutralizing lubricating oil be injected into the biogas stream to protect all of the above-described fuel delivery system components. A reservoir 36 containing acid neutralizing oil connects to a valve 38 mounted to the pump intake 34, and neutralizing oil is injected into the biogas stream. The oil has a total basic number ("TBN") that is greater than 14, and when it mixes with any acids that form from biogas constituents, they are neutralized and become far less corrosive. By injecting the neutralizing oil upstream from the fuel delivery system components, all the components are coated with neutralizing oil. When the engine is shut down and unburned biogas is injected into the cylinder 20, neutralizing oil is also introduced and coats the cylinder walls to neutralize any acids and prevent corrosion. The same neutralizing oil is used in the engine crankcase 40 for engine lubrication, and an impregnated acid-neutralizing filter 42 is used to clean the crankcase oil. A filter such as the model G82308 commercially available from Filtration Systems of Waukesha, Wis., may be used for this purpose.

Figure 3:
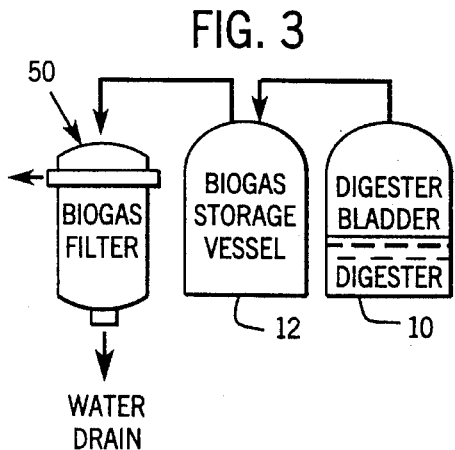
FIG. 3 is a schematic drawing of a first biogas source for use with the delivery system of FIG. 2.
Figure 4:
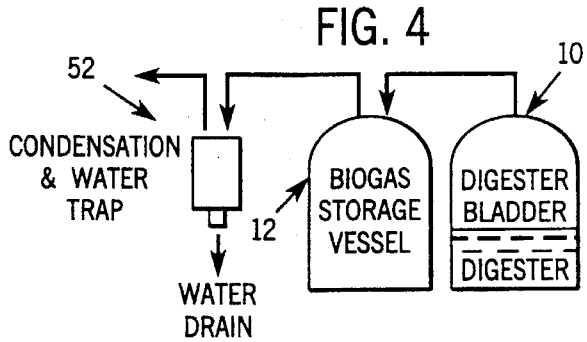
FIG. 4 is a schematic drawing of a second biogas source for use with the delivery system of FIG. 2.

Depending on the characteristics of the biogas, it may be supplied directly to the intake 34 of the pump 32, or it may be filtered first. Referring to FIG. 3, if the biogas contains an unusually large proportion of hydrogen sulfide, a biogas filter 50, such as the G81016 "Gas Master" commercially available from Filtration Systems of Waukesha, Wis., may be employed. On the other hand, if the biogas contains concentrations of water in either liquid or vapor form, a condensation and water trap 52 may be employed as shown in FIG. 4. While these devices increase the cost, they are significantly less costly than liquid absorbents, activated charcoal, or iron sponge filters required by prior art systems.

In the preferred embodiment of the invention, the internal combustion engine is employed to drive an electrical generator. This generator set is operated when there is a sufficient supply of biogas, and then it is shut down for a period of time while the biogas supply is replenished. This intermittent engine operation has proven to be a particularly challenging situation because raw biogas is left in the engine cylinders after each shut down and acidic byproducts are produced which are highly corrosive. In a typical form application, for example, the generator may operate for a period of four hours and then be shut down for twenty hours.

Figure 5:
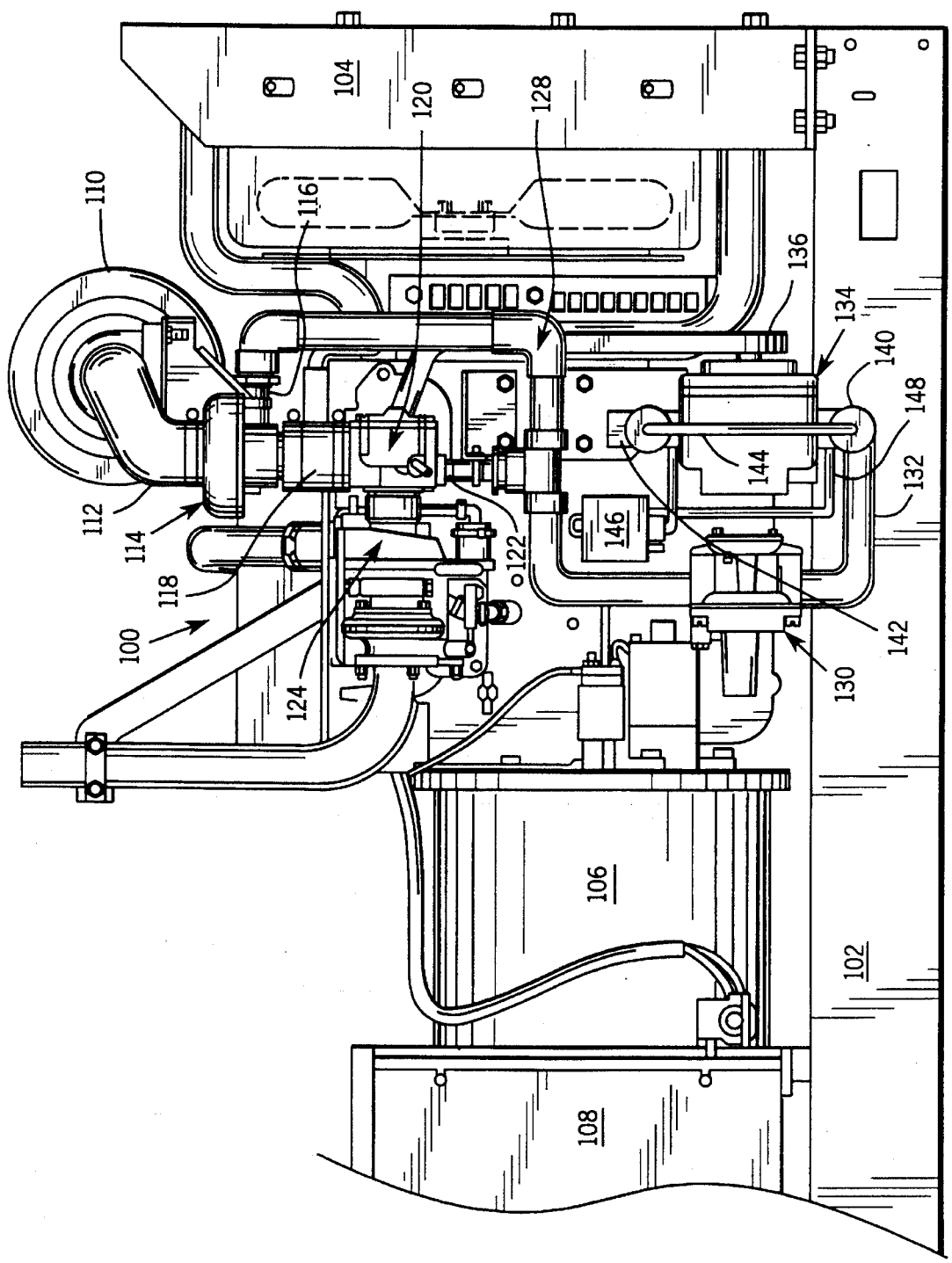
FIG. 5 is an elevation view of a generator set which employs a preferred embodiment of the invention.

Referring particularly to FIG. 5, the generator set includes a model LSG-423 four cylinder, turbocharged engine 100 manufactured by the Ford Motor Company. The engine 100 is mounted on a frame 102 which also supports a radiator 104, an electrical generator 106 and an enclosure 108 for the associated control circuitry. The engine 100 rotates the generator shaft (not shown) and the generator 106 produces electricity that is regulated and distributed by the electronics inside the enclosure 108.

Combustion air for the engine 100 is received through an air filter 110 and is coupled through hose 112 to the air intake on a first carburetor/mixer 114. The carburetor/mixer 114 also receives biogas fuel at an intake 116 and the air/fuel mixture is output through hose 118. Because biogas has a much lower percentage of methane than LP gas (e.g. 60%), a second carburetor/mixer 120 is used to boost the amount of biogas in the air/fuel mixture to thereby compensate for this deficiency. The hose 118 connects to the air intake of the second carburetor/mixer 120, and biogas is input at its fuel intake 122. The air/fuel mixture from carburetor/mixer 120 is applied through a turbocharger 124 to the fuel intake port of each engine cylinder. The first carburetor/mixer 114 is a model CA/25m which is commercially available from Impco Technologies, Inc. of Cerritos, Calif.; and the second carburetor/mixer 120 is a model 100 also commercially available from Impco Technologies, Inc.

The biogas is supplied to the carburetor/mixers 114 and 120 through a supply pipe 128 that connects to the output of a regulator 130. The regulator 130 is an model ES-307 commercially available from Maxitrol Company of Southfield, Mich., and it is operable to regulate the biogas pressure in the supply pipe 128 to 3 to 6 inches of water. The biogas is supplied to the regulator 130 through a pipe 132 that connects to the output of a compressor pump 134. The regulator 130 is mounted to the frame 102 such that its diaphragm (not shown in the drawings) is oriented in a substantially vertical plane. While the diaphragm need not be vertical, it is important that the regulator 130 be mounted such that neutralizing oil in the biogas stream flowing through it will not "pool" on the diaphragm and hinder its operation.

Figure 6:
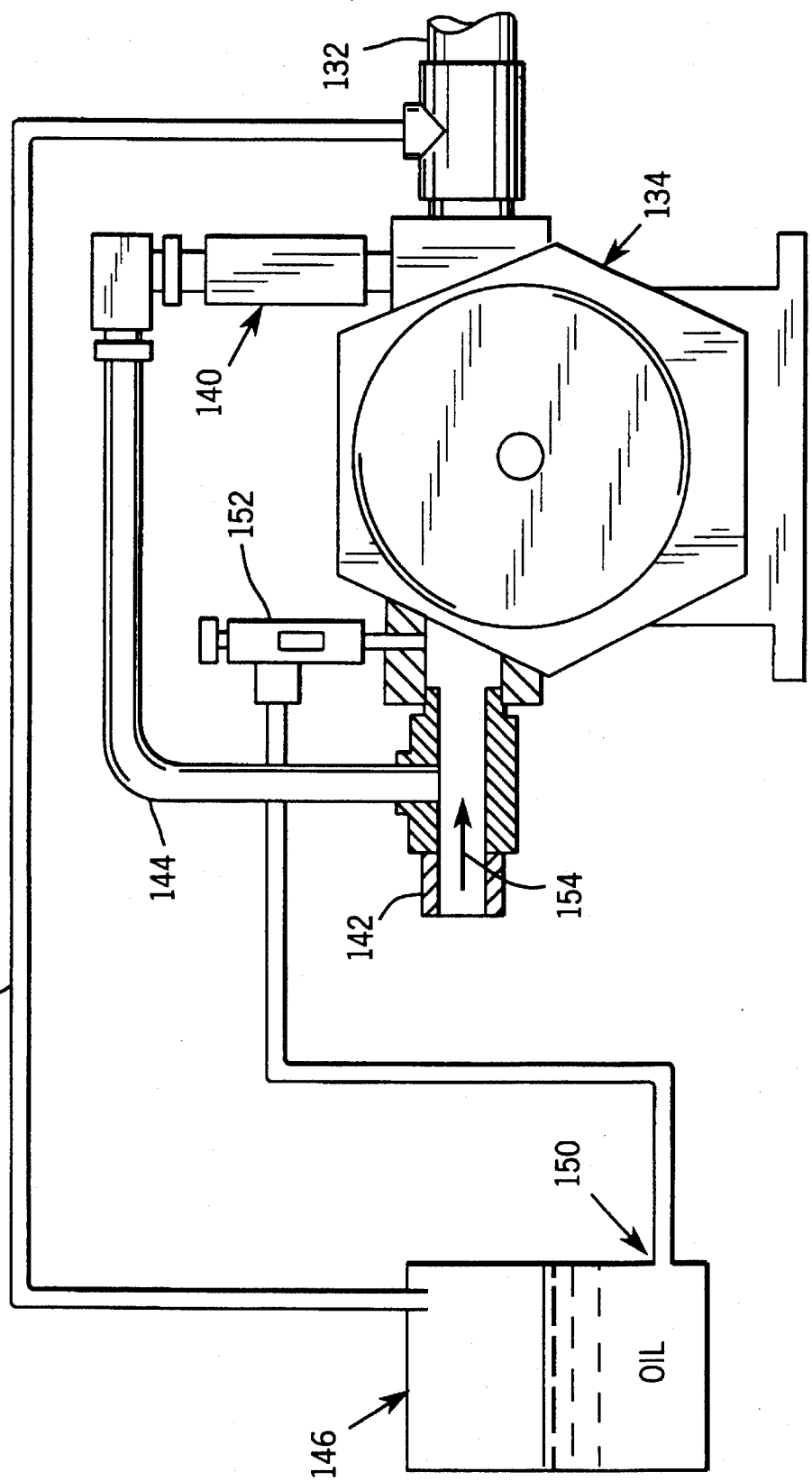
FIG. 6 is a schematic diagram of the compressor and associated oil injection system which forms part of the generator set of FIG. 5.

Referring to both FIGS. 5 and 6, the compressor pump 134 is a Cond model OL03 rotary vane oil vapor pump commercially available from Westmoor Ltd. of Sherrill, N.Y. The compressor pump 134 is driven by the engine 100 through a belt 136 that engages a pulley (not shown) connected to the forward end of the engine crankshaft. The compressor pump 134 has a capacity of 14 cfm at 1200 rpm, and it boosts the biogas pressure at its input 142 from less than 4 inches of water to more than 11 inches of water at its output 132. A pressure relief valve 140 connects between the pump output 132 and its input 142 through tubing 144, and it is set to open when the pressure differential exceeds 15 inches of water.

Neutralizing oil stored in a reservoir 146 is injected into the biogas stream flowing through the compressor pump 134. A vent in the oil reservoir 146 connects to the compressor pump output 132 through tubing 148 to provide a relatively constant pressure on the oil. The oil flows out through a drain opening 150 in the oil reservoir 146 and passes through a metering value 152 to the input 142 of the compressor pump 134. The metering value 152 is adjusted to allow approximately 20 drops per minute of neutralizing oil to drip into the biogas stream 154 flowing into the compressor pump 134. This is sufficient oil to lubricate the compressor pump 134, and to coat the biogas-exposed surfaces of the regulator 130, carburetor/mixers 114 and 120 and the engine cylinders. A neutralizing oil such as Rimula 30 commercially available from Shell Oil Company is preferred, although any lubricating oil having a relatively high total based number will reduce corrosion. The same oil is used in the oil sump to lubricate the engine, and there is thus no problem if the two oils mix.

We claim:

1. A biogas fuel supply system for providing fuel to the intake of an internal combustion engine, which comprises:

a carburetor having an air intake and a biogas intake, the carburetor being operable to mix air with a stream of biogas supplied to the carburetor biogas intake and deliver the mixture to said engine intake;

a reservoir for storing acid-neutralizing oil; and an injector coupled to the reservoir for receiving acid-neutralizing oil and injecting it into the stream of biogas supplied to the carburetor.

2. The biogas fuel supply system as recited in claim 1 in which the acid-neutralizing oil has a total base number greater than 14.

3. The biogas fuel supply system as recited in claim 1 in which a regulator is connected to receive the oil injected stream of biogas and supply said oil injected stream of biogas to the carburetor at a substantially constant pressure.

4. The biogas fuel supply system, as recited in claim 3, in which a pump is connected to receive the oil-injected stream of biogas at its intake and to supply said oil-injected stream of biogas to the engine regulator at a substantially higher pressure than that at the pump intake.

5. The biogas fuel supply system, as recited in claim 1, in which the injector is a valve which controls the rate at which acid-neutralizing oil flows into the biogas stream.

6. The biogas fuel supply system as recited in claim 5 in which the reservoir is an enclosed container having a drain connected to the injector valve and a vent connected for pressurization.

7. The biogas fuel supply systems, as recited in claim 6, which includes a pump for boosting the pressure of the biogas stream supplied to the carburetor, and the injector is connected to the input of the pump, and the reservoir vent is connected to the output of the pump.

* * * * *